(12) United States Patent
Larsson et al.

(10) Patent No.: US 6,327,705 B1
(45) Date of Patent: Dec. 4, 2001

(54) METHOD FOR CREATING AND MAINTAINING USER DATA

(75) Inventors: Jeffrey Eric Larsson, Seattle; Joel Wayne Downer, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/168,828

(22) Filed: Oct. 8, 1998

(51) Int. Cl.[7] .................................................. G06F 9/445
(52) U.S. Cl. .............................. 717/11; 713/1; 707/104; 707/200
(58) Field of Search ............................ 717/11, 1; 713/1; 709/221; 710/104; 345/333, 334, 352–354; 707/100, 104, 200

(56) References Cited

U.S. PATENT DOCUMENTS

| | | | |
|---|---|---|---|
| 5,048,085 | * | 9/1991 | Abraham et al. ...................... 380/23 |
| 5,412,772 | * | 5/1995 | Monson ................................ 345/335 |
| 5,600,776 | * | 2/1997 | Johnson et al. ....................... 395/326 |
| 5,760,768 | * | 6/1998 | Gram ................................... 345/333 |
| 5,771,381 | * | 6/1998 | Jones et al. ........................... 713/100 |
| 5,797,015 | * | 8/1998 | Daniels, Jr. et al. .................. 717/11 |
| 5,903,896 | * | 5/1999 | Waldman et al. .................... 707/200 |
| 5,933,646 | * | 8/1999 | Hendrickson et al. ................ 717/11 |
| 6,081,855 | * | 6/2000 | deCarmo .............................. 710/62 |

OTHER PUBLICATIONS

Mike Kelly, "Gain Control of Application Setup and Maintenance with the New Windows Installer," Microsoft Systems Journal, Sep. 1998, pp. 15–18 & 20–24.*

* cited by examiner

*Primary Examiner*—Tuan Q. Dam
(74) *Attorney, Agent, or Firm*—Merchant & Gould

(57) ABSTRACT

Creating and maintaining user data using an installation file that includes features and user data components. A user data component is associated with two features (or subfeatures), an application feature and a user settings feature. The application feature is used to create user data for the user that installs the application program and the user settings feature is used to create user data for another user that initiates the application program.

25 Claims, 10 Drawing Sheets

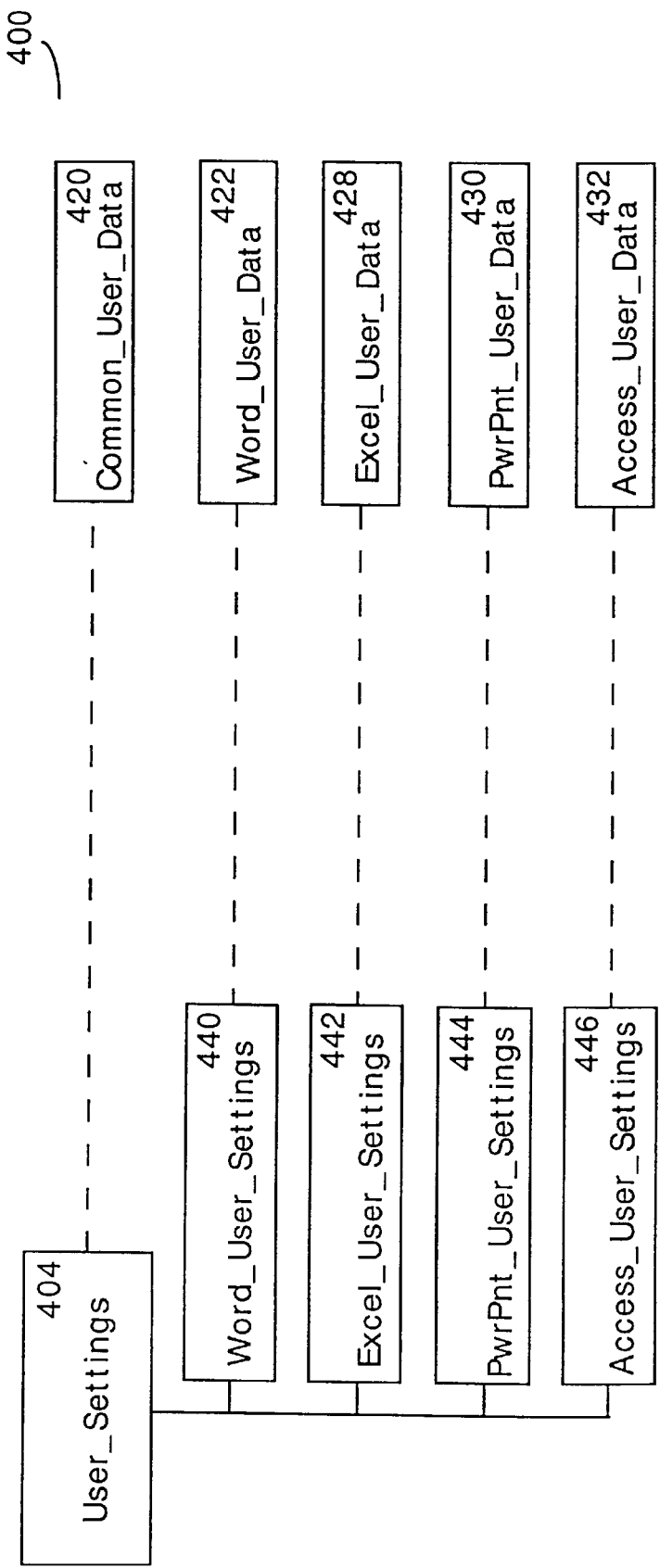

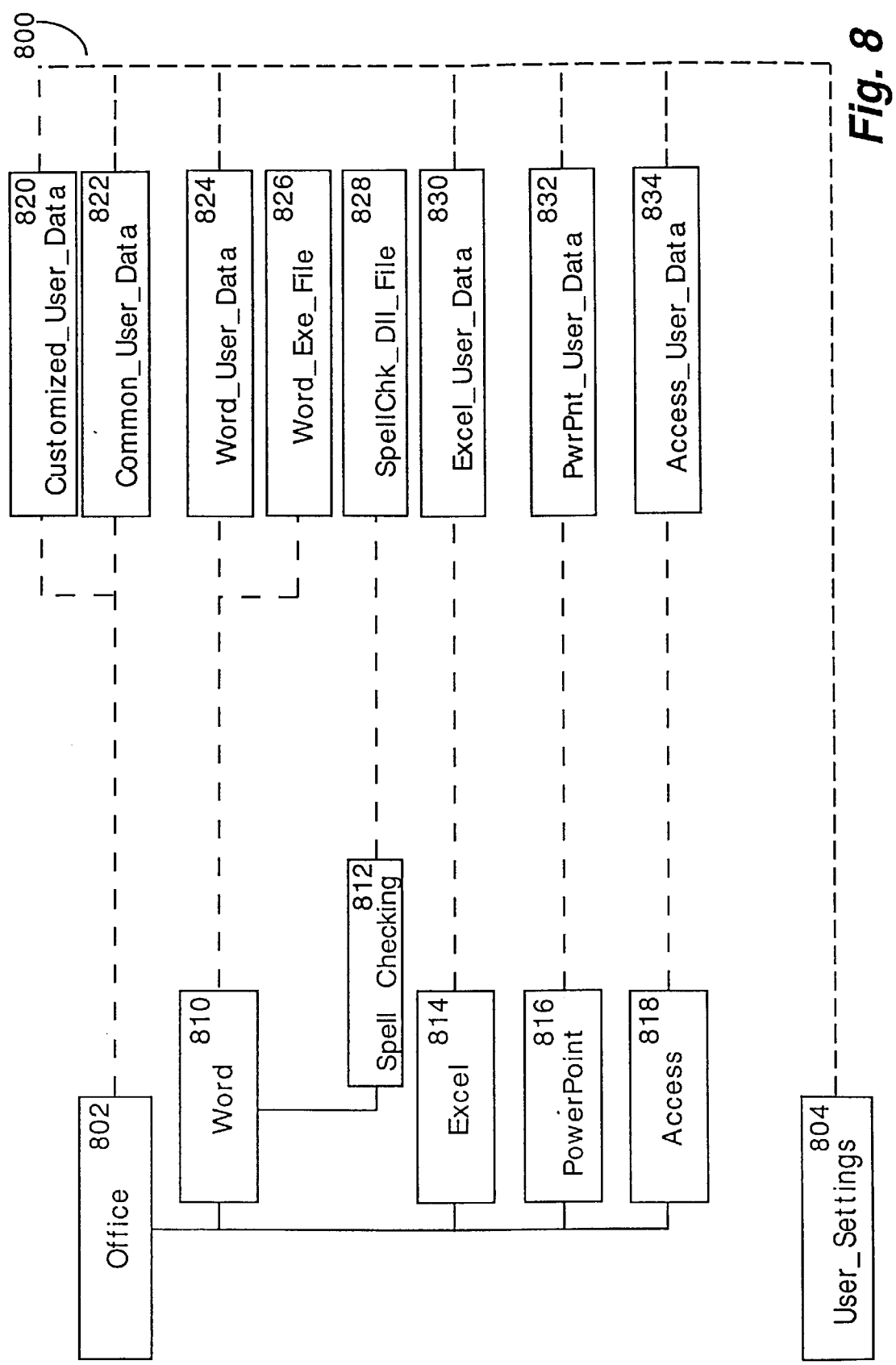

METHOD FOR CREATING AND MAINTAINING USER DATA

TECHNICAL FIELD

This invention relates in general to storing user preference information, and more particularly to creating and maintaining user preference information for multiple users sharing a single computer system.

BACKGROUND OF THE INVENTION

Most computer programs, such as an application program, allow a user to specify user preferences that affect how the computer program interacts with the user. For example, a word processing application program typically allows the user to specify the default font, default colors, and default toolbar buttons. User preference information is influenced by personal taste, as well as the type of tasks typically performed by the user. For example, a user whose personal taste is more traditional probably prefers a different default font than a user whose personal taste is more contemporary. Likewise, a user whose primary word processing task is creating documents that include mostly single column text, probably prefers a different default toolbar than a user whose primary word processing task is creating documents that include multiple columns, tables or charts.

In the past, user preference information was maintained on a per system basis. Maintaining user preference information on a per system basis assumes that only one user operates the computer system or that all users that operate the computer system can share a single set of user preference information. However, if a number of different users share a single computer system and the users require different user preference information, then there is a need for maintaining a set of user preference information for each user.

If there are multiple users sharing a single computer system, then only one of the users installs the application program and runs setup. In some organizations, a system administrator installs the application program on all of the computer systems in the organization so that none of the actual users of the application program run setup. In both of these situations, a user that does not run setup does not have the same user preference information as the user (or system administrator) that ran setup. Thus, there is a need to create user preference information for all users, not just the user that installed the application program.

In addition to installing the application program, the system administrator can customize the default user preference information to tailor the default user preference information to the needs of the organization. If the system administrator customizes the default user preference information, then all of the users of the system should have access to the customized user preference information and the customized user preference information should be integrated with the preference information created by the user.

There may be times when a user needs to uninstall or reinstall an application program. This may happen if the user encounters a problem with the application program or if a maintenance update for the application program is released. If the user uninstalls the application program, then the user preference information for that application program may be removed. Similarly, if the user reinstalls the application program, then the user preference information for that application program may be overwritten with the default preference information provided with the application program. Therefore, there is a need for a method for maintaining user preference information even if the application program is uninstalled or reinstalled.

User preference information is typically stored on the computer system. For example, computer systems that use the "WINDOWS" operating system marketed by Microsoft Corporation of Redmond, Wash. store user preference information in a registration database (the "registry") or in an application data folder. The registry is structured as a hierarchically structured tree and contains keys and registry values. The registry includes the HKEY_LOCAL_MACHINE key, the HKEY_CURRENT_USER key, and the HKEY_USERS key. The HKEY_LOCAL_MACHINE key contains information about the configuration of the computer system. The HKEY_USERS key contains subkeys for every user that has ever logged on to the system and saved user preference information, as well as a default subkey. The HKEY_CURRENT_USER key points to the appropriate subkey of the HKEY_USERS key for the current user. Typically, an application data folder is created for each user that has logged onto the computer system.

Although there have been prior attempts to solve the problem of creating and maintaining user data for multiple users, none of the prior attempts have been completely satisfactory. One attempt to solve the problem was included in the "OFFICE 97" suite of application programs marketed by Microsoft Corporation. This attempt stored default user preference information in the registry under the HKEY_LOCAL_MACHINE key. When one of the application programs of the "OFFICE 97" application suite was initiated, a determination was made as to whether there was user preference information in the registry. If the determination was that there was no user data in the registry, then the default user preference information was copied from the HKEY_LOCAL_MACHINE key. However, if the determination was that there was user preference information in the registry, then the default user preference information was not copied. One drawback of this attempt is that it only handles user preference information that is stored in the registry. It does not handle user preference information that is stored in a user preference file. Another drawback is that it does not offer a system administrator an easy way to customize default user preference information.

Accordingly, there is a need in the art for a method for creating and maintaining user preference information for multiple users that accommodates user preference information stored in the registry or in a file. In addition, the method should provide a system administrator an easy way to customize default user preference information. The method should also maintain user preference information even though the application program is uninstalled or reinstalled.

SUMMARY OF THE INVENTION

The present invention meets the needs described above by providing a method for creating and maintaining user data using an installation file. User data includes user preference information stored as a user data registry value or a user data file. User data is created and maintained for all users, not just the user that installs the application program. If multiple users share a single computer system, then user data is created for each user so that each user can have a unique set of user data.

The installation file includes features and components. A component is a collection of files, registry values, and other resources, that are installed or uninstalled as a unit. Features are essentially groupings of components. Features are hierarchical so that a feature may have subfeatures. A subfeature inherits the characteristics of its parent feature. The installation file includes user data components and non-user data components. A user data component contains user data information, such as registry values and user data files. A non-user data component contains non-user data information, such as a file that contains an executable program. In the installation file, a user data component is associated with two features or subfeatures, an application feature (or subfeature) and a user settings feature (or subfeature). The application feature is used to create user data when the application program is installed and the user settings feature is used to create user data when the application program is initiated by a user that did not install the application program. If the installation file supports multiple application programs, then there may be multiple user data components associated with the user settings feature.

In one aspect of the invention, an exemplary installation file includes two features. One feature corresponds to a suite of application programs, the application suite feature, and the other feature corresponds to user settings for the suite of application programs, the user settings feature. Under the application suite feature are application subfeatures and under the user settings feature are application user settings subfeatures. There is a user data component for each application program of the suite of application programs, as well as a common user data component for user data shared by the application programs. The common user data component is associated with the application suite feature and the user settings feature. Each application user data component is associated with an application subfeature and an application user settings subfeature.

In another aspect of the invention, an exemplary installation file includes two features. One feature corresponds to a suite of application programs, the application suite feature, and the other feature corresponds to user settings for the suite of application programs, the user settings feature. However, in this aspect, subfeatures only exist under the application suite feature. There are no subfeatures under the user settings feature. The subfeatures under the application suite feature are application subfeatures. There is a user data component for each application program of the suite of application programs, as well as a common user data component for user data shared by the application programs. The common user data component is associated with the application suite feature and the user settings feature. Each application user data component is associated with an application subfeature and the user settings feature.

The installation file is used whenever a user installs or initiates the application program. If the user initiates the application program, then the application program was previously installed by that user or by another user. In response to the installation or initialization of the application program, a determination is made as to whether user data exists for the user. The determination is made by checking the registry of the computer system for a registry value designated for the user. If the registry value indicates that user data does not exist for the user, then the installation file is used to install user data.

The user settings feature (or subfeatures) of the installation file is used to determine what user data components to install. The user data components associated with the user settings feature are installed by installing the user data registry values and the user data files specified by the user data components. The user data registry values are installed in a section of the registry that is designated for the user and the user data files are installed on the hard disk drive of the computer system. The user data files are typically installed in an application data folder designated for the user. Each user data component is associated with a registry key. Once the user data components are installed, then the values of the corresponding registry keys are set to indicate that the user data components are installed.

Typically, the non-user data components of the installation file are installed when the application program is installed. Each non-user data component is associated with either a feature or a subfeature. If a non-user data component is associated with an application feature, then the non-user data component is installed when the application program corresponding to the application feature is installed.

Both the user data components and the non-user data components are installed conditionally, i.e. the components are installed only if not already installed. In addition, the user data components remain installed if the application program is uninstalled. These characteristics allow user data to be maintained even though the application program is uninstalled or reinstalled.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIGS. 4A and 4B are block diagrams of a portion of an exemplary installation file constructed in accordance with an embodiment of the present invention.

FIG. 8 is a block diagram of a portion of another exemplary installation file constructed in accordance with an embodiment of the present invention.

DETAILED DESCRIPTION OF THE INVENTION

The present invention is directed to a method for creating and maintaining user data for multiple users of a single computer system. In one embodiment, the invention is incorporated into the "OFFICE 2000" suite of application programs marketed by Microsoft Corporation of Redmond, Wash. Briefly described, the method uses an installation file that includes features and user data components. For the "OFFICE 2000" application suite, the installation file includes an Office feature and a user settings feature. The Office feature has a subfeature for each of the application programs of the application suite. The user settings feature has a subfeature for user settings for each of the application programs. The installation file also includes a user data component for each of the application programs, as well as a common user data component for user data shared by the applications. Each user data component is associated with an application subfeature and a user settings subfeature. The application subfeature is used to create user data for the user that installs the application program and the user settings subfeature is used to create user data for another user that initiates the application program. As used herein, the term user data includes user preference values stored as user data registry values or user data files.

Exemplary Operating Environment

Figure 1:
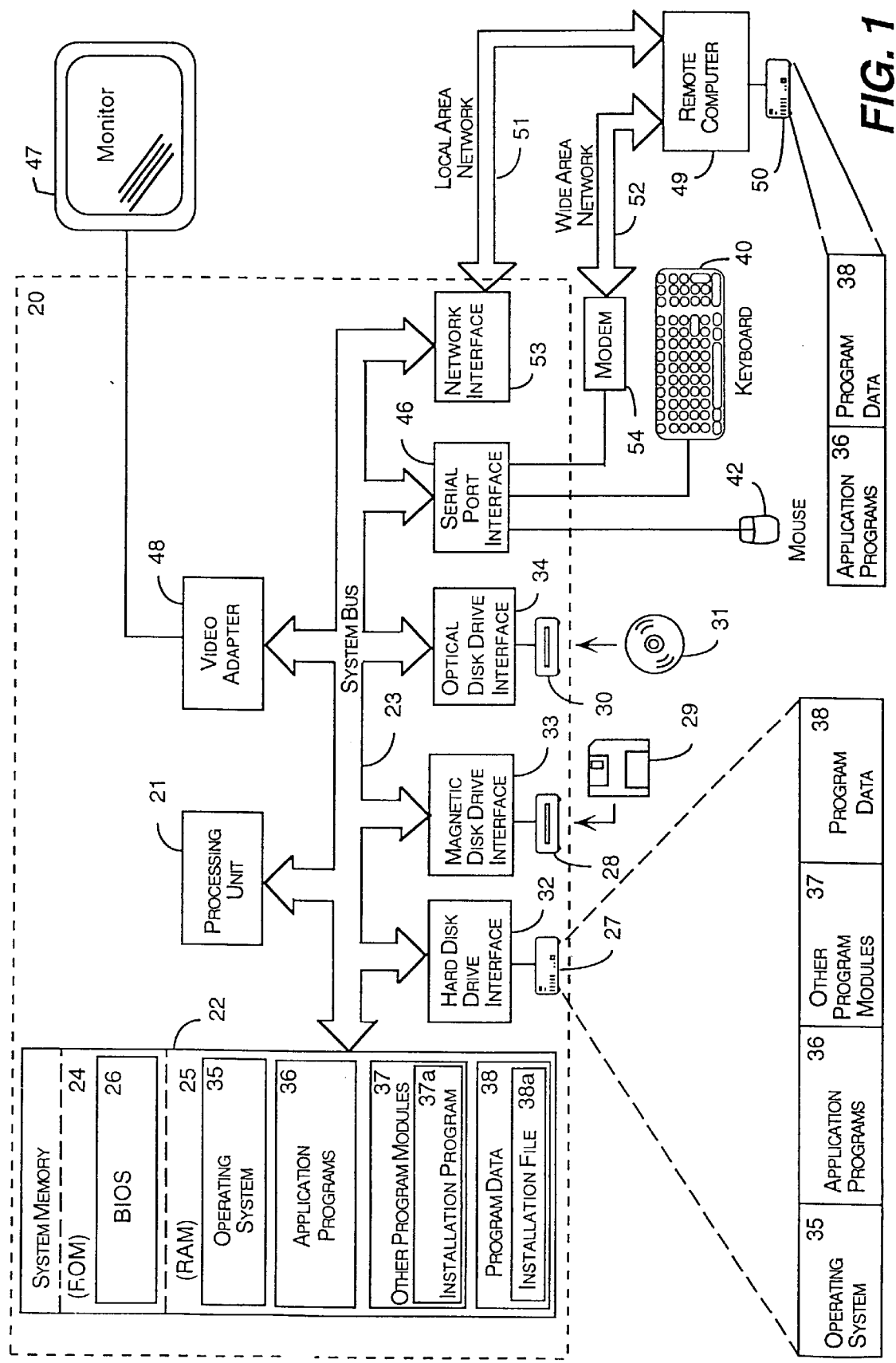
FIG. 1 is a block diagram of a personal computer illustrating an exemplary operating environment for an embodiment of the present invention.

FIG. 1 and the following discussion are intended to provide a brief, general description of a suitable computing environment in which the present invention may be implemented. Although not required, the invention will be described in the general context of computer-executable instructions, such as a program module or file, running on a personal computer. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, including an installation program 37a, and program data 38, including an installation file 38a. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

User Data

Figure 2:
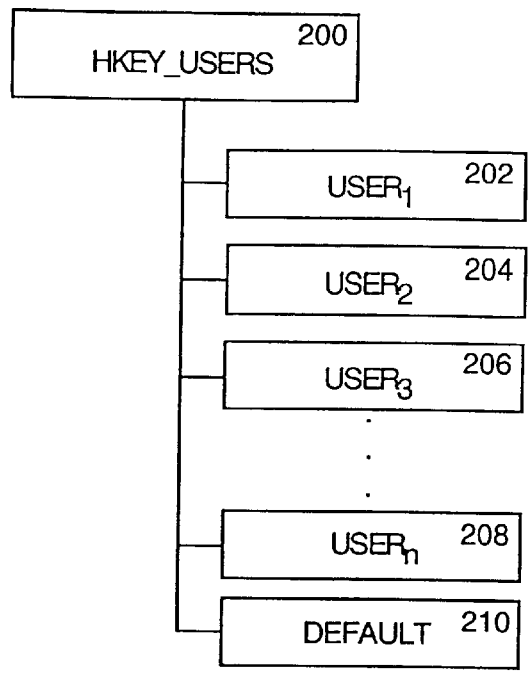
FIG. 2 is a block diagram of a HKEY_USERS key in accordance with an embodiment of the present invention.

User data is stored in either the registry or in a file. The registry is a registration database that is maintained by the operating system. The registry is structured as a hierarchically structured tree and includes keys and registry values. A registry value can be a text string, an integer number, or a binary string. The registry includes the HKEY_CURRENT_USER key and the HKEY_USERS key. The HKEY_USERS key contains subkeys for every user that has ever logged on to the system and saved user data. The HKEY_USERS key is illustrated in FIG. 2. FIG. 2 shows the HKEY_USERS key 200 and subkeys, USER$_1$ 202, USER$_2$ 204, USER$_3$ 206, . . . USER$_n$ 208, and DEFAULT 210. The DEFAULT subkey 210 is used to create a new user subkey when a new user logs on to the system. The HKEY_CURRENT_USER key points to the appropriate subkey for the current user. If User$_1$ is the current user, then HKEY_CURRENT_USER points to the USER$_1$ subkey. If User$_1$ logs off and User$_3$ logs on, then HKEY_CURRENT_USER points to the USER$_3$ subkey.

Figure 3:
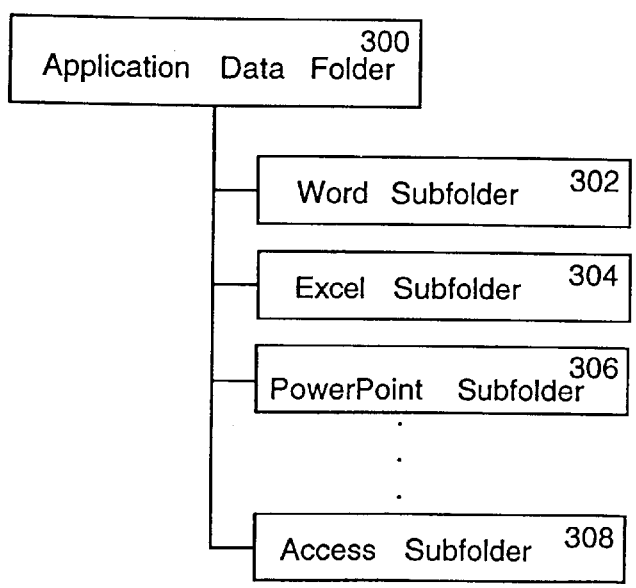
FIG. 3 is a block diagram of an application data folder in accordance with an embodiment of the present invention.

In addition to the registry, user data is also stored in files. Typically, the files containing user data are installed in an application data folder. The application data folder generally resides on the hard disk drive of the computer system. The application data folder includes subfolders that store files for different application programs. Each application uses one or more subfolders to store data. An exemplary application data folder is illustrated in FIG. 3. FIG. 3 shows the application data folder 300 and application subfolders 302, 304, 306, and 308. Each application subfolder corresponds to a different application program. For example, the Word subfolder 302 corresponds to the "WORD" application program, the Excel subfolder 304 corresponds to the "EXCEL" application program, the PowerPoint subfolder 306 corresponds to the "POWERPOINT" application program, and the Access subfolder 308 corresponds to the "ACCESS" application program. Preferably, an application data folder is created for each user. For example, under the "WINDOWS NT" operating system, if the operating system is installed to the default location, then an application data folder is created for User$_1$ at c:\winnt\profiles\user1\application data. If a second user, User$_2$, logs on to the computer system, then a second application data folder is created for User$_2$ at c:\winnt\profiles\user2\application data. By creating a separate application data folder for each user, the user data files for User$_1$ do not interfere with the user data files for User$_2$, etc.

An Exemplary Installation File

The installation file includes features and components. A component is a collection of files, registry values, and other resources, that are installed or uninstalled as a unit on the computer system. Components have no hierarchy. Features typically represent the functional features of an application program. Features are essentially groupings of components. An example of a feature is spell checking and an example of a corresponding component is a spell checking dll (dynamic link library). Features are hierarchical so that a feature may have subfeatures. A subfeature inherits the characteristics of its parent feature. If a subfeature is installed, then its parent feature is also installed.

Figure 4A:
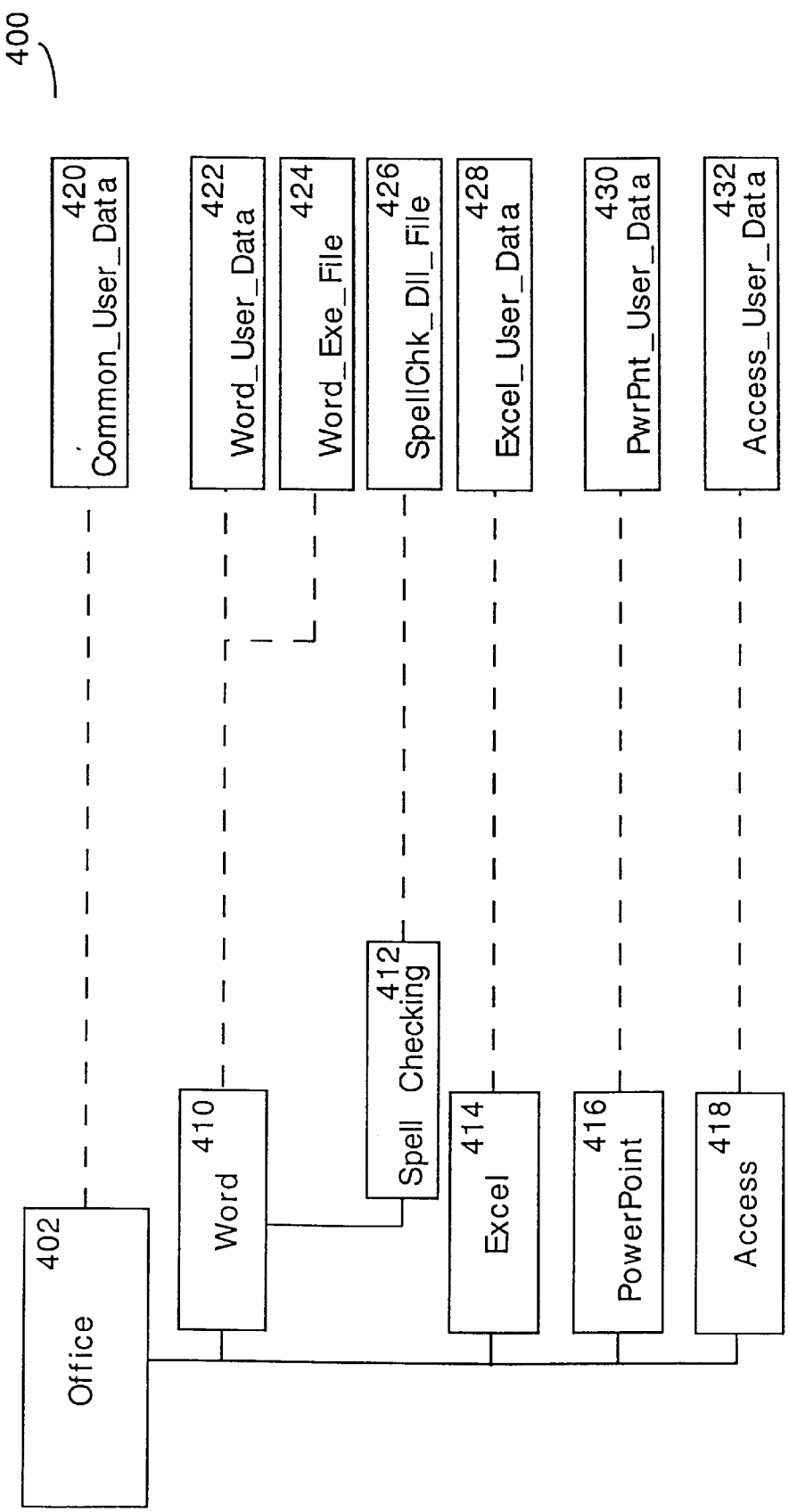

A portion of an exemplary installation file for the "OFFICE 2000" application suite is shown in FIGS. 4A and 4B. For ease of explanation, FIGS. 4A and 4B focus on the portion of the installation file 400 that deals with user data. The installation file has two features, the Office feature 402 and the User_Settings feature 404. Under the Office feature 402 are subfeatures that correspond to the application programs in the "OFFICE 2000" application suite. For example, FIGS. 4A and 4B include the Word subfeature 410 that corresponds to the "WORD" application program, the Excel subfeature 414 that corresponds to the "EXCEL" application program, the PowerPoint subfeature 416 that corresponds to the "POWERPOINT" application program, and the Access subfeature 418 that corresponds to the "ACCESS" application program. Under the Word subfeature 410 is a sub-subfeature, Spell Checking 412. Under the User_Settings feature 404 are several subfeatures that correspond to the user settings for the application programs of the application suite. For example, FIGS. 4A and 4B include the Word_User_Settings subfeature 440, the Excel_User_Settings subfeature 442, the PowerPoint_User_Settings subfeature 444, and the Access_User_Settings subfeature 446.

The installation file 400 has user data components and non-user data components. A user data component contains user data information, such as registry values and user data files. A non-user data component contains non-user data information, such as a file that contains an executable program. The user data components shown in FIGS. 4A and 4B include a user data component for each application program (Word_User_Data 422, Excel_User_Data 428, PowerPoint_User_Data 430, and Access_User_Data 432), as well as a common user data component for user data shared by one or more of the application programs (Common_User_Data 420). The non-user data components shown in FIG. 4A are Word_Exe_File 424 and SpellChecking_Dll_File 426. Although not shown in FIGS. 4A and 4B, a typical installation file for the "OFFICE 2000" application suite includes additional non-user data components, such as the Excel_Exe_File component and the PowerPoint_Exe_File component.

Each component is associated with one or more features (or subfeatures). For example, the Common_User_Data component 420 is associated with the Office feature 402 and the User_Settings feature 404, and the Word_User_Data component is associated with the Word subfeature 410 and the Word_User_Settings subfeature 440.

A registry key is created for each of the user data components. Each registry key has a named value, "User-Data" (REG_DWORD). If UserData is equal to one, then user data exists for the current user. If UserData does not equal one, then user data does not exist for the current user. Exemplary registry keys for the user data components shown in FIGS. 4A and 4B are shown in Table 1.

TABLE 1

HKEY_CURRENT_USER\Software\Microsoft\Office\9.0\Common, UserData
HKEY_CURRENT_USER\Software\Microsoft\Office\9.0\Word, UserData
HKEY_CURRENT_USER\Software\Microsoft\Office\9.0\Excel, UserData
HKEY_CURRENT_USER\Software\Microsoft\Office\9.0\PowerPoint, UserData
HKEY_CURRENT_USER\Software\Microsoft\Office\9.0\Access, UserData Creating User Data User data can be created for a particular user when the user installs an application program or suite of application programs, or when the user initiates an application program. Creating user data when the user installs a suite of application programs can be illustrated by a first user, User$_1$, installing the "OFFICE 2000" application suite. As the "OFFICE 2000" application suite is installed, the user data components associated with the Office feature and subfeatures of the installation file (FIGS. 4A and 4B) are installed. Thus, the Common_User_Data, Word_User_Data, Word_Exe_File, SpellChecking_Dll_File, Excel_User_Data, PowerPoint_User_Data, and Access_User_Data components are installed. The user data components are installed for the computer system by installing the registry values and the user data files of the user data components for User$_1$. The registry values are stored in the registry under the HKEY_CURRENT_USER key and the files are stored in the application data folder. As discussed above, the HKEY_CURRENT_USER key points to the USER$_1$ subkey under the HKEY_USERS key and the application data folder designated for User$_1$ is used to store the user data files. The non-user data components are also installed. For example, the Word_Exe_File component is installed on the hard disk drive of the computer system. The non-user data files are not stored under the application data folder.

When User$_1$ initiates one of the application programs, such as the "WORD" application program, the application program calls an API (application programming interface) to the operating system to determine whether user data exists for User$_1$. The API returns two registry values. For this example, the API returns the registry values shown in Table 2.

TABLE 2

HKEY_CURRENT_USER\Software\Microsoft\Office\9.0\Common, UserData
HKEY_CURRENT_USER\Software\Microsoft\Office\9.0\Word, UserData If the registry values returned are both equal to one, then user data exists for User$_1$. Otherwise, no user data exists for User$_1$. In this example, user data exists for User$_1$ because User$_1$ installed the application program when the "OFFICE 2000" application suite was installed. If User$_1$ changes any of the settings of the application program, then the changes are stored in the appropriate location in either the registry or the application data folder.

Creating user data when an application program is initiated can be illustrated by a second user, User$_2$, initiating an application program from the same computer system used by User$_1$. When User$_2$ logs onto the computer system, the HKEY_CURRENT_USER key is remapped to the USER$_2$ subkey under the HKEY_USERS key and the application data folder corresponds to User$_2$. When User$_2$ initiates the application program, the application program calls the API to determine whether user data exists for User$_2$. In this example, the API returns registry values that are not equal to one because no user data exists for User$_2$. The user data for User$_1$ was installed so that only User$_1$ can access it. Therefore, when the application program determines whether user data exists for User$_2$, the user data for User$_1$ is ignored.

Once the application program determines that no user data exists for User$_2$, then the application program calls an installation program to install user data for User$_2$. The installation program uses the User_Settings feature and subfeatures of the installation file (FIG. 4B) to install user data for User$_2$. As discussed above in connection with FIGS. 4A and 4B the Common_User_Data component is associated with the User_Settings feature, and the Word_User_Data, Excel_User_Data, PowerPoint_User_Data, and Access_User_Data components are associated with the subfeatures of the User_Settings feature. The user data components that are associated with the User_Settings application subfeature and the User_Settings feature are installed. For example, if User$_2$ initiates the "WORD" application program, then the Word_User_Data component is installed, and because the User_Settings feature is the parent of the Word User_Settings subfeature, the Common_User_Data component is also installed.

The user data components are installed by installing the registry values and the files associated with the user data components. The registry values are written to the area of the registry pointed to by the HKEY_CURRENT_USER key and the files are written to the application data folder designated for User$_2$. Because the non-user data components (Word_Exe_File and SpellChecking_Dll_File) are not associated with the Word_User_Settings subfeature, the non-user data components are not installed. If User$_2$ changes any of the settings of the application program, then the changes are stored in the appropriate location in either the registry or the application data folder.

Another Exemplary Installation File

Figure 5:
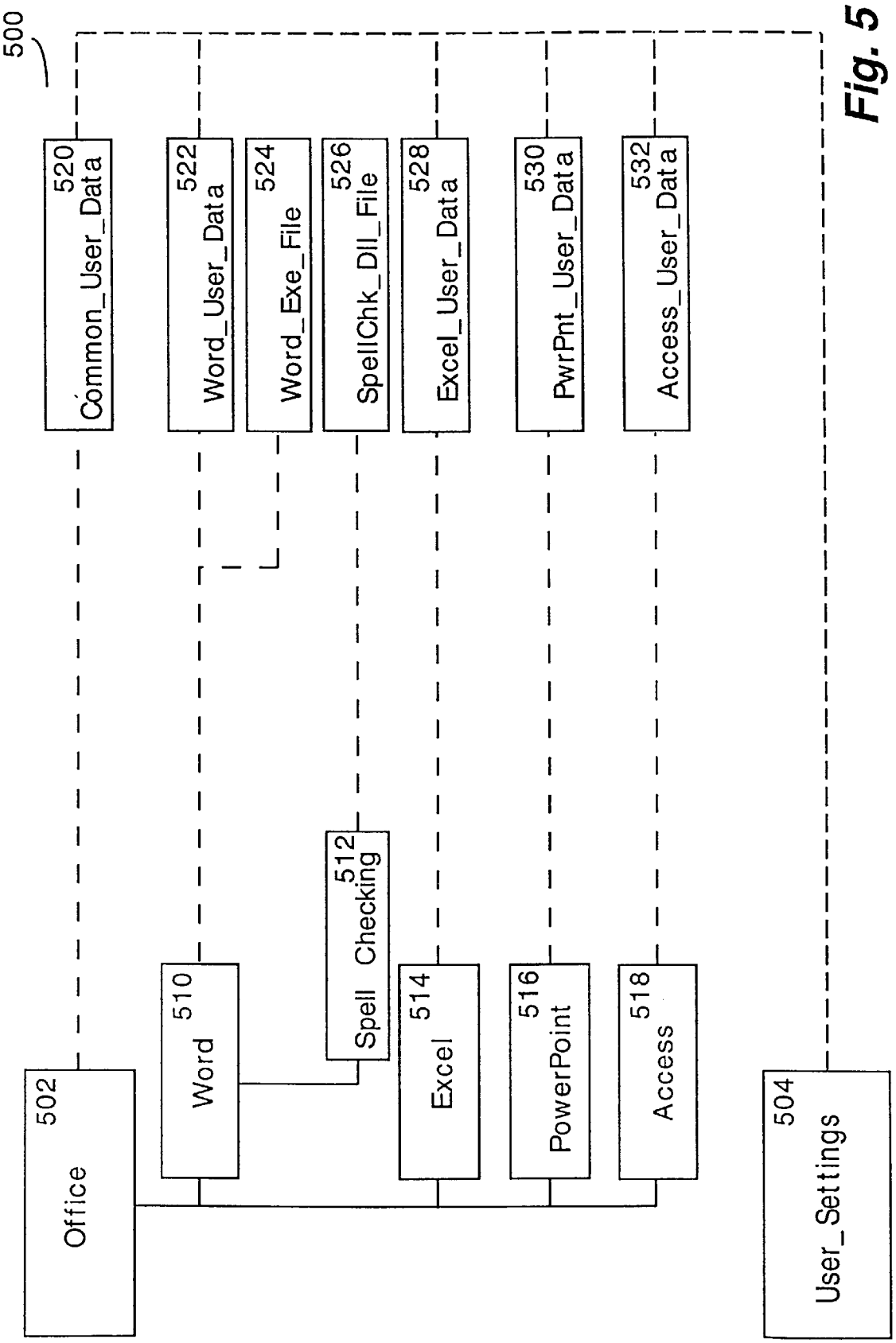
FIG. 5 is block diagrams of a portion of another exemplary installation file constructed in accordance with an embodiment of the present invention.

A portion of another exemplary installation file for the "OFFICE 2000" application suite is shown in FIG. 5. For ease of explanation, FIG. 5 focuses on the portion of the installation file 500 that deals with user data. The installation file has two features, Office 502 and User_Settings 504. Under the Office feature 502 are several subfeatures, including the Word subfeature 510, the Excel subfeature 514, the PowerPoint subfeature 516, and the Access subfeature 518. Under the Word subfeature 510 is a sub-subfeature, Spell Checking 512. The difference between the installation file illustrated in FIGS. 4A and 4B and the installation file illustrated in FIG. 5 is that there are no subfeatures under the User_Settings feature 504 in FIG. 5. Because there are no subfeatures under the User_Settings feature 504, all of the user data components (Common_User_Data 520, Word_User_Data 522, Excel_User_Data 528, PowerPoint_User_Data 530, and Access_User_Data 532), are associated with the User_Settings feature 504.

The difference between the installation file illustrated by FIGS. 4A and 4B and the installation file illustrated by FIG. 5 can be illustrated by considering what happens when User$_2$ initiates an application program that was previously installed by User$_1$. When User$_2$ initiates the application program, the application program determines that no user data exists for User$_2$. Once the application program determines that no user data exists for User$_2$, then the application program calls the installation program to install user data for User$_2$. The installation program uses the User_Settings feature of the installation file (FIG. 5) to install user data for User$_2$. All of the user data components (Common_User_Data, Word_User_Data, Excel_User_Data, PowerPoint_User_Data, and Access_User_Data) are installed because all of the user data components are associated with the User_Settings feature.

The user data components are installed by installing the registry values and the files associated with the user data components. The registry values are written to the area of the registry pointed to by the HKEY_CURRENT_USER key and the files are written to the application data folder designated for User$_2$. Because the non-user data components (Word_Exe_File and SpellChecking_Dll_File) are not associated with the User_Settings feature, the non-user data components are not installed. By using the installation file illustrated in FIG. 5, the user data components for all of the application programs of the application suite are installed when one of the application programs is initiated. In contrast, by using the installation file illustrated in FIGS. 4A and 4B, only the user data component for the application being initiated is installed.

As will be apparent to those skilled in the art, other installation file configurations are possible. For example, instead of a feature corresponding to a suite of application programs, a feature could correspond to a single application program. If a feature corresponds to a single application program, then a user data component for the application program is associated with the feature rather than a subfeature.

Maintaining User Data

The components of the installation file are installed conditionally, i.e. the components are installed only if not previously installed. In addition, the user data components are not uninstalled if the application program is uninstalled. These characteristics allow user data to be maintained even though the application program is uninstalled or reinstalled. For example, if an application program is reinstalled, then only the non-user data components of the application program are installed, e.g. Word_Exe_File for the "WORD" application program. However, because the user data components, e.g. Word_User_Data, are already installed, the user data components are not installed again. This prevents overwriting the user data components for a particular user with the user data components that were provided with the application program. If the application program is uninstalled, then the non-user data components of the application program are uninstalled, but the user data components are not uninstalled. Therefore, the user data components are maintained if the application program is reinstalled.

Method for Creating and Maintaining User Data

Figure 6A:
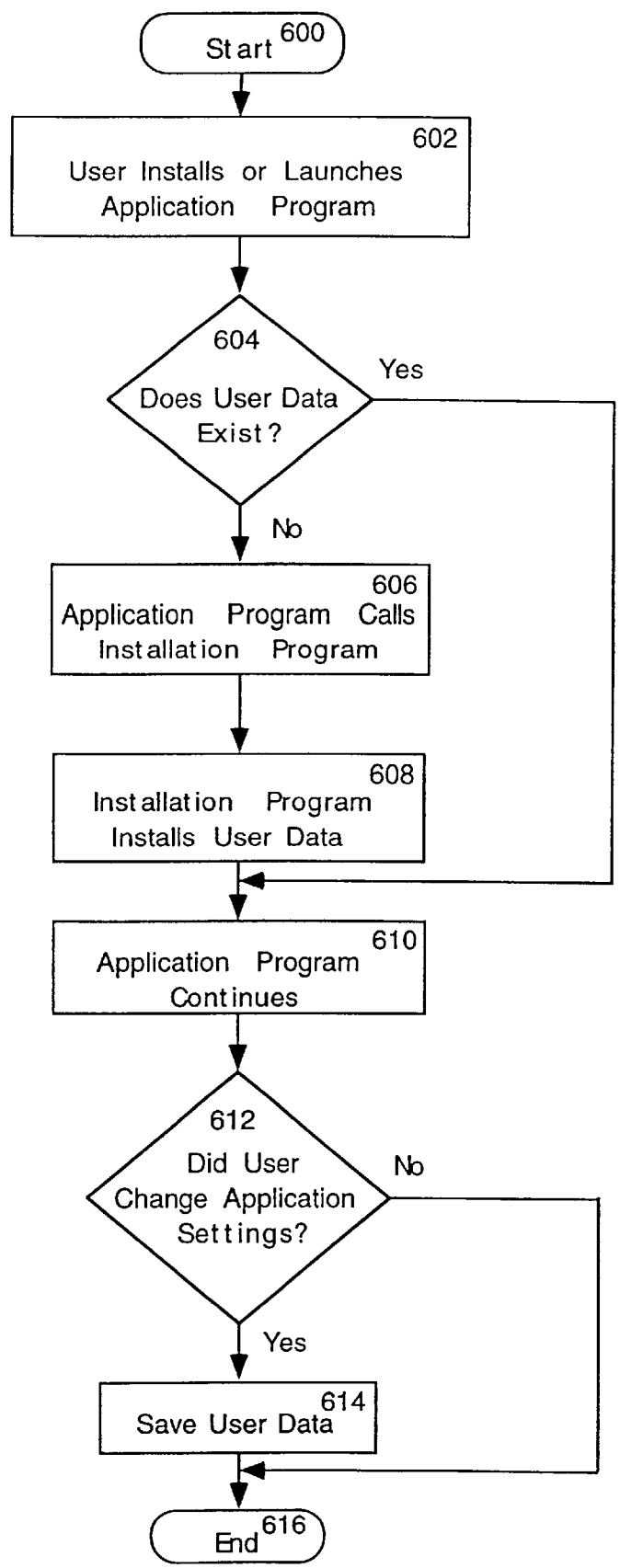
FIGS. 6A and 6B are flow diagrams illustrating the steps for creating and maintaining user data, in accordance with an embodiment of the present invention.
Figure 6B:
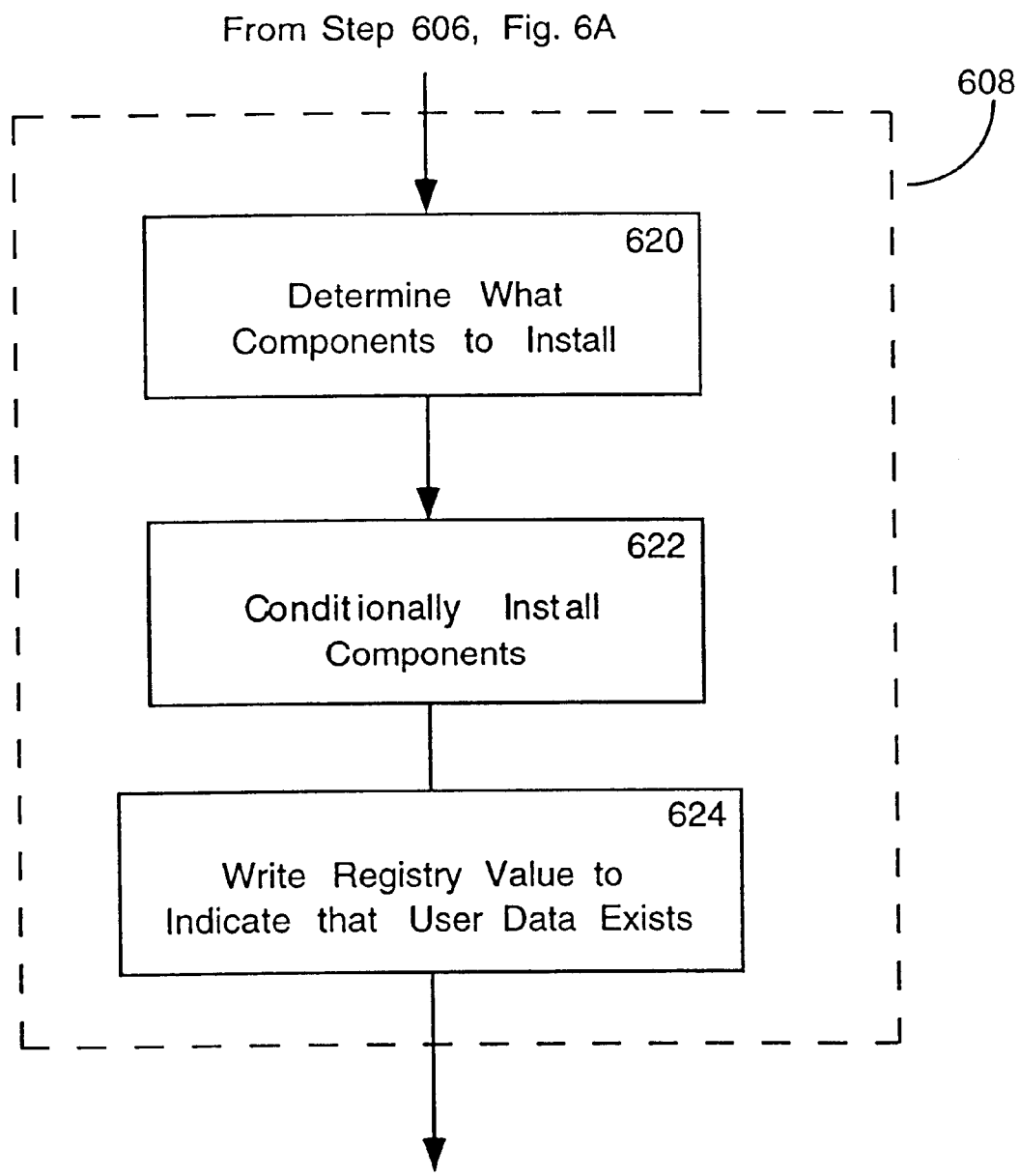

The steps of an exemplary method for creating and maintaining user data are shown in FIGS. 6A and 6B. The method illustrated in FIGS. 6A and 6B uses the installation file illustrated in FIGS. 4A and 4B or FIG. 5. The method starts in step 600 and proceeds to step 602. In step 602, a user installs or initiates an application program on the computer system. If the user initiates an application program, then the application program was previously installed by that user or by another user. In step 604, the application program determines whether user data exists for the user. As discussed above, the application program calls an API to determine whether user data exists for the user. For example, if the user is initiating or installing the "WORD" application program, the API returns the exemplary registry values shown in Table 3.

TABLE 3

HKEY_CURRENT_USER\Software\Microsoft\Office\9.0\Common, UserData
HKEY_CURRENT_USER\Software\Microsoft\Office\9.0\Word, UserData If the registry values returned are both equal to one, then user data exists for the user and the Yes branch is followed to step 610. By proceeding to step 610 when user data exists, the user data components are not reinstalled and the user data is maintained.

If the registry values are not both equal to one, then the determination at step 604 is that the user data does not exist. The No branch is followed to step 606 and the application program calls the installation program. The installation program installs user data using the installation file at step 608. Additional details of step 608 are discussed in connection with FIG. 6B below. The application program continues operation at step 610. Once the application program is closed, the method proceeds to step 612. A determination is made at step 612 as to whether the user changed any user data. If the user changed any user data, then the Yes branch is followed to step 614. In step 614, the changes to the user data are saved. The changes are saved as either registry values or files. Once the changes are saved, the method ends at step 616. If the determination at step 612 is that the user did not change any user data, then the No branch is followed to step 616 and the method terminates.

If the user is installing the application program, then the non-user data components are installed in addition to the user data components at step 608. For example, if the user is installing the "WORD" application program using the installation file illustrated in FIGS. 4A and 4B or FIG. 5, then the installation program also installs the Word_Exe_File component and the SpellChecking_Dll_File component. However, if the application program was previously installed and the user is just initiating the application program, then the non-user data components are not reinstalled for the user because the non-user data components are already installed on the computer system.

The steps shown in FIGS. 6A and 6B are also followed when the user reinstalls an application program. The user could be reinstalling the application program to install an updated version of the application program or to correct an error associated with the application program. If the user data components were previously installed, then the determination in step 604 is that the user data exists. The method then proceeds to step 610 and does not reinstall the user data components.

Additional details of step 608 are shown in FIG. 6B. In step 620, the installation program accesses the installation file to determine what components to install. If the installation file illustrated in FIGS. 4A and 4B is used to install user data when the "WORD" application program is initiated, then the user data components associated with the Word_User_Settings subfeature and the User_Settings feature are installed. If the installation file illustrated in FIG. 5 is used to install user data when the "WORD" application program is initiated, then all of the user data components associated with the User_Settings feature are installed. In either case, the components are installed at step 622 by conditionally installing the registry values and the files specified by the components. The components are conditionally installed so that if a component already exists, the component is not reinstalled. In step 624, the installation program sets the appropriate registry values to indicate that user data exists for the user. For example, if the installation file illustrated in FIGS. 4A & 4B is used when the "WORD" application program is initiated, then the exemplary registry values shown in Table 4 are set. If the installation file illustrated in FIG. 5 is used when the "WORD" application program is initiated, then the exemplary registry values shown in Table 5 are set.

TABLE 4

HKEY_CURRENT_USER\Software\Microsoft\Office\9.0\Common, UserData
HKEY_CURRENT_USER\Software\Microsoft\Office\9.0\Word, UserData

TABLE 5

HKEY_CURRENT_USER\Software\Microsoft\Office\9.0\Common, UserData
HKEY_CURRENT_USER\Software\Microsoft\Office\9.0\Word, UserData
HKEY_CURRENT_USER\Software\Microsoft\Office\9.0\Excel, UserData
HKEY_CURRENT_USER\Software\Microsoft\Office\9.0\PowerPoint, UserData
HKEY_CURRENT_USER\Software\Microsoft\Office\9.0\Access, UserData The registry values are set so that when the user subsequently initiates the application program, the determination in step 604 of FIG. 6A will be that user data exists.

Customizing User Data

Figure 7A:
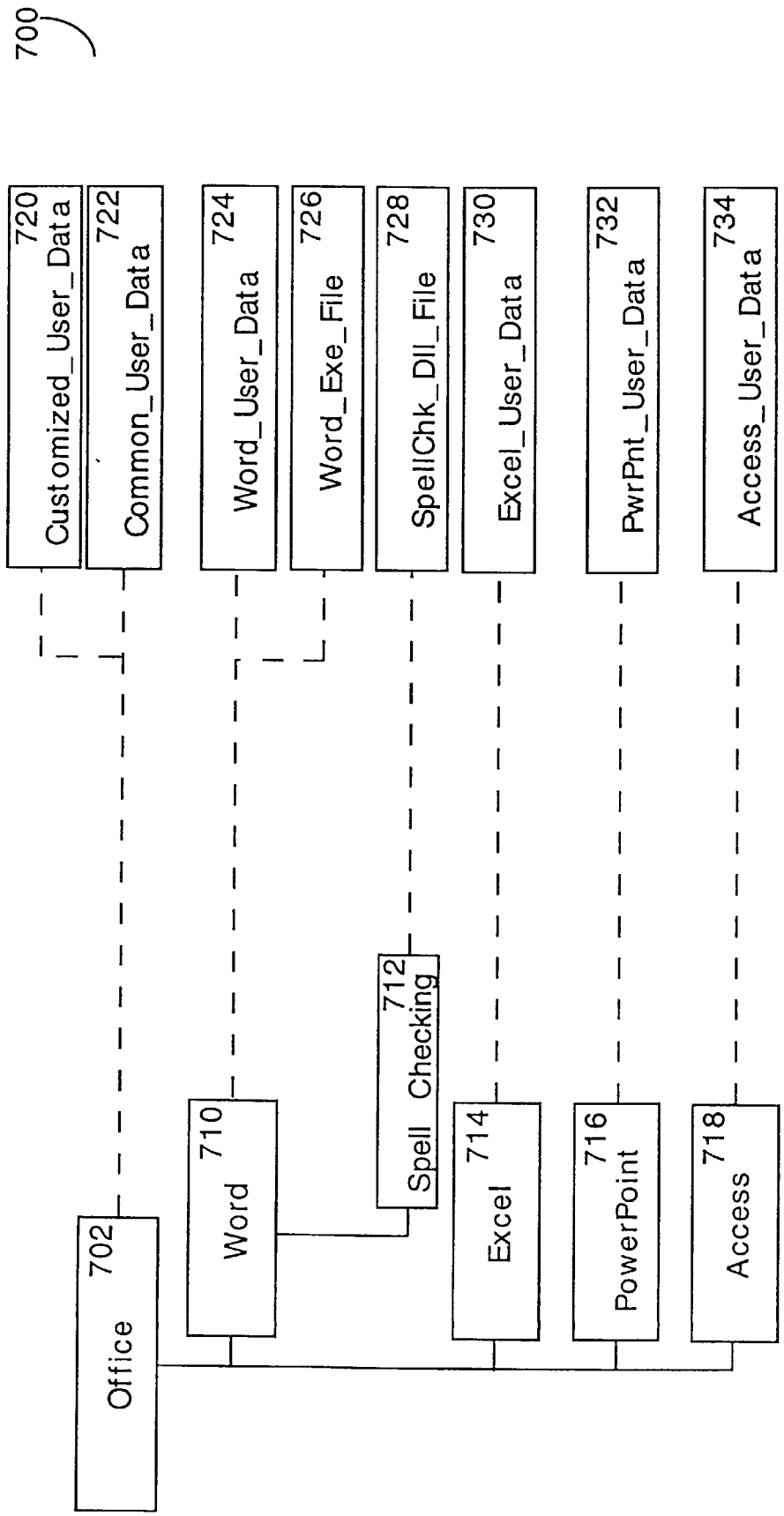
FIGS. 7A and 7B are block diagrams of a portion of another exemplary installation file constructed in accordance with an embodiment of the present invention.
Figure 7B:
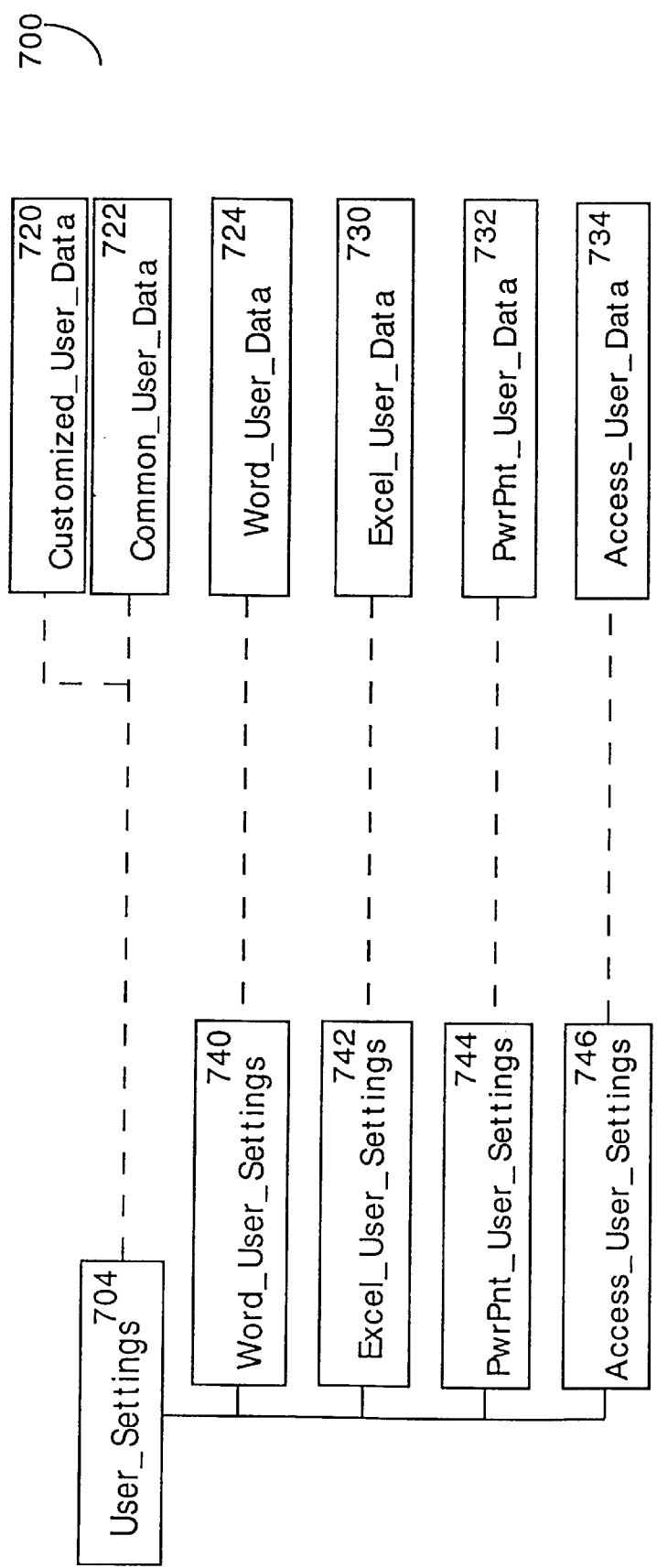

The installation file can accommodate customized user data created by a system administrator. The system administrator creates a component for the customized user data. The customized user data can include both registry values and files. An exemplary installation file that includes a component for customized user data is shown in FIGS. 7A and 7B. FIGS. 7A and 7B are identical to FIGS. 4A and 4B, except for the addition of the Customized_User_Data component 720. The Customized_User_Data component 720 is associated with the Office feature 702 and the User Settings feature 704. Associating the Customized_User_Data component 720 with the Office feature 702 allows the customized user data to be installed when the user installs the "OFFICE 2000" application suite. Associating the Customized_User_Data component 720 with the User_Settings feature 704 allows the customized user data to be installed when another user initiates one of the "OFFICE 2000" application programs. The installation of the Customized_User_Data component is similar to the installation of the other user data components which is discussed above in more detail in connection with FIGS. 4A and 4B.

Another exemplary installation file that includes a component for customized user data is shown in FIG. 8. FIG. 8 is identical to FIG. 5, except for the addition of the Customized_User_Data component 820. The Customized_User_Data component 720 is associated with the Office feature 702 and the User_Settings feature 704. The installation of the Customized_User_Data component is similar to the installation of the other user data components which is discussed above in more detail in connection with FIG. 5.

Method for Restoring Default User Data

There may be instances when an error occurs that is attributable to user data for a particular user. If so, then the user data for that user can be reset to the default user data that was provided with the application program. For example, if errors exist with the user data for the "WORD" application program for User$_2$, then the user data for the "WORD" application program for User$_2$ can be reset. The user data is reset by deleting the registry values that indicate that user data exists for User$_2$. Specifically, the registry values shown in Table 6 are deleted.

TABLE 6

HKEY_CURRENT_USER\Software\Microsoft\Office\9.0\Common, UserData
HKEY_CURRENT_USER\Software\Microsoft\Office\9.0\Word, UserData Deleting these registry values for User$_2$ causes the user data components to be installed when User$_2$ next initiates or installs the "WORD" application program. However, because the registry values for the other users were not deleted, the user data for the other users of the computer system are preserved.

In summary, the present invention is directed toward creating and maintaining user data on a computer system. An installation file that includes features and user data components is used to create and maintain user data. Each user data component is associated with two features (or subfeatures), an application feature and a user settings feature. The user data components are installed for each user. The application feature is used to install the user data components when the application program is installed and the user settings feature is used to install the user data components when the application program was previously installed. Although the present invention has been described using a suite of application programs, "OFFICE 2000," those skilled in the art will realize that the present invention does not require a suite of application programs for operation, and can be used in connection with a single program module. Also, the present invention is not limited to use with application programs and can be used with a variety of program modules, including operating systems, browsers, and utilities.

Although the present invention has been described in connection with the installation file and the installation program used with the "OFFICE 2000" suite of application programs, those skilled in the art will realize that the invention can also be used with other installation files and installation programs so long as the installation file and the installation program support the creation and maintenance of user data for multiple users as described herein. For example, the invention can be used with installation files that support features and components or other constructs that are equivalent to the features and components.

The invention also can be used with an installation program that supports the conditional installation of components, distinguishes between user data components and non-user data components, supports application queries regarding the installation of a component, and supports selective installation of features. The conditional installation of components prevents overwriting user data components for a particular user with user data components that were provided with the application program if the application program is reinstalled. Distinguishing between user data components and non-user data components prevents the deletion of a user data component if the application program is uninstalled. Supporting application queries regarding the installation of a component allows an application program to determine whether user data exists for a particular user. Supporting the selective installation of features allows the installation of a feature that corresponds to user data without requiring that all the features and subfeatures that correspond to the application program be installed.

Alternative embodiments will be apparent to those skilled in the art to which the present invention pertains without departing from its spirit and scope. Accordingly, the scope of the present invention is described by the appended claims and is supported by the foregoing description.

What is claimed is:

1. A method for creating user data associated with a user when the user initiates a program module, the program module having been previously installed using an installation file, comprising the steps of:

in response to the user initiating the program module, determining whether user data exists for the user;

if user data does not exist for the user, then creating user data for the user by:

identifying a user data component of the installation file that is associated with the program module; and using the user data component to create user data for the user without reinstalling the program module; and providing an indication that user data exists for the user.

2. The method of claim 1, wherein the step of determining whether user data exists for the user, comprises:

checking a registry value to determine whether user data exists for the user.

3. The method of claim 2, wherein the step of providing an indication that user data exists for the user, comprises:

setting the registry value to indicate that user data exists for the user.

4. The method of claim 1, wherein the user data component specifies user data registry values, and wherein the step of using the user data component to create user data comprises:

setting the user data registry values for the user in a section of a registry designated for the user.

5. The method of claim 1, wherein the user data component specifies a user data file, and wherein the step of using the user data component to create user data comprises:

creating the user data file in an application data folder designated for the user.

6. The method of claim 1, wherein the installation file comprises a program module feature that corresponds to the program module and a user settings feature, and the user data component is associated with both the program module feature and the user settings feature, and wherein the step of identifying a user data component of the installation file that is associated with the program module comprises:

using the user settings feature to identify the user data component.

7. The method of claim 1, wherein the installation file comprises a program module feature and a non-user data component and the program module feature is associated with the non-user data component and the user data component, and wherein the program module is installed using the program module feature to install the non-user data component and the user data component, further comprising the step of:

in response to the user uninstalling the program module, uninstalling the non-user data component, but not the user data component.

8. A computer-readable medium having stored thereon a data structure, comprising:
   a first feature comprising a plurality of application subfeatures and corresponding to a plurality of application programs, each of the application subfeatures corresponding to a different one of the application programs;
   a second feature comprising a plurality of user settings subfeatures; and
   a plurality of components including
      a common user data component associated with the first feature and the second feature;
      a plurality of application user data components, each of the application user data components associated with one of the application subfeatures and one of the user settings subfeatures; and
      a plurality of non-user data components, each of the non-user data components associated with one of the application subfeatures;
   wherein the first feature and the application subfeatures are used to install the common user data component, the application user data components, and the non-user data components when the application programs are installed.

9. The computer-readable medium of claim 8, wherein the second feature corresponds to user settings for a plurality of application programs and a selected one of the user settings subfeatures associated with a selected application user data component corresponds to a selected application program, and wherein the second feature and the selected user settings subfeature are used to install the common user data component and the selected application user data component if user data for a user does not exist when the user initiates the selected application program.

10. The computer-readable medium of claim 8, further comprising a customized user data component that is associated with the first feature and the second feature.

11. A computer-readable medium having stored thereon a data structure, comprising:
   a first feature comprising a plurality of subfeatures and corresponding to a plurality of application programs, each of the subfeatures corresponding to a different one of the application programs;
   a plurality of components including
      a common user data component associated with the first feature;
      a plurality of application user data components, each of the application user data components associated with one of the subfeatures; and
      a plurality of non-user data components, each of the non-user data components associated with one of the subfeatures; and
   a second feature that is associated with the common user data component and the application user data components;
   wherein the first feature and the subfeatures are used to install the common user data component, the application user data components, and the non-user data components when the application programs are installed.

12. The computer-readable medium of claim 11, wherein each of the subfeatures corresponds to a different application program and wherein the second feature is used to install the common user data component and the application user data components if user data for a user does not exist when the user initiates one of the application programs.

13. The computer-readable medium of claim 11, wherein a selected subfeature associated with a selected application user data component corresponds to a selected application program, and wherein the second feature is used to install the common user data component and the selected application user data component if user data for a user does not exist when the user initiates the selected application program.

14. The computer-readable medium of claim 11, further comprising a customized user data component that is associated with the first feature and the second feature.

15. A method for creating user data for multiple users using an installation file comprising a first feature and a second feature, the first feature corresponding to a program module and associated with a user data component and the second feature associated with the user data component, wherein the first feature is used to install the user data component for a first user when the first user installs the program module, comprising the steps of:
   in response to a second user initiating the program module, determining whether user data exists for the second user; and
   if user data does not exist for the second user, then using the second feature to install the user data component for the second user independent of the installed user data component for the first user.

16. The method of claim 15, wherein the step of determining whether user data exists for the second user comprises checking a registry value associated with the second user.

17. The method of claim 15, wherein the user data component comprises user data registry values and user data files, and installing the user data component for the first user comprises setting the user data registry values for the first user in a first section of the registry designated for the first user and creating the user data files in a first application data folder designated for the first user, and wherein the step of creating user data for the second user comprises:
   setting the user data registry values for the second user in a second section of the registry designated for the second user; and
   creating the user data files for the second user in a second application data folder designated for the second user.

18. The method of claim 17, wherein the step of creating the user data files for the second user comprises:
   conditionally creating each of the user data files for the second user so that a selected one of the user data files is not created, if the selected file already exists.

19. The method of claim 15, wherein the first feature is associated with a non-user data feature, further comprising the steps of:
   if the first user uninstalls the program module, then uninstalling the non-user data component, but not the installed user data component for the first user.

20. The method of claim 15, wherein the first feature is associated with a non-user data feature, further comprising the steps of:
   if the second user reinstalls the program module, then reinstalling the non-user data component, but not the installed user data component for the second user.

21. A method for creating user data associated with a user using an installation file having a first feature and a second feature, the first feature corresponding to an application program and associated with a user data component and the second feature associated with the user data component, comprising the steps of:
   in response to a first user installing the application program, determining whether a first set of user data exists;

if the first set of user data does not exist, then using the first feature to install the first set of user data;

in response to a second user initiating an application program, determining whether a second set of user data exists; and if the second set of user data does not exist, then using the second feature to install the second set of user data.

22. The method of claim 21, wherein the user data component comprises a user data registry value and a user data file, and wherein the step of using the first feature to install the first set of user data comprises:

using the first feature to identify the user data component;

setting the user data registry value in a first section of the registry designated for the first user; and creating the user data file in a first application data folder designated for the first user.

23. The method of claim 21, wherein the user data component comprises a user data registry value and a user data file, and wherein the step of using the second feature to install the second set of user data comprises:

using the second feature to identify the user data component;

setting the user data registry value in a second section of the registry designated for the second user; and creating the user data file in a second application data folder designated for the second user.

24. The method of claim 21, wherein the step of determining whether a first set of user data exists comprises checking a first registry value.

25. The method of claim 21, wherein the first feature is associated with a non-user data component, further comprising the step of:

in response to the first user uninstalling the application program, uninstalling the non-user data component associated with the first feature, but not the first set of user data or the second set of user data.

* * * * *